United States Patent
Ehrlich

(10) Patent No.: US 11,490,230 B1
(45) Date of Patent: *Nov. 1, 2022

(54) CAPTURING MESSAGES FROM A PHONE MESSAGE EXCHANGE

(71) Applicant: FirmScribe, LLC, Kihei, HI (US)

(72) Inventor: Cheyenne Ehrlich, Paia, HI (US)

(73) Assignee: FIRMSCRIBE, LLC., Kihei, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,493

(22) Filed: Apr. 27, 2022

Related U.S. Application Data

(63) Continuation of application No. 17/396,181, filed on Aug. 6, 2021, now Pat. No. 11,350,252.

(51) Int. Cl.
| | | |
|---|---|---|
| *H04M 1/725* | (2021.01) | |
| *H04W 4/14* | (2009.01) | |
| *H04M 3/53* | (2006.01) | |

(52) U.S. Cl.
CPC ........... *H04W 4/14* (2013.01); *H04M 3/5307* (2013.01)

(58) Field of Classification Search
None
See application file for complete search history.

(56) References Cited

U.S. PATENT DOCUMENTS

| | | |
|---|---|---|
| 2011/0029622 A1 | 2/2011 | Walker et al. |
| 2011/0250870 A1 | 10/2011 | Silva |
| 2014/0003296 A1 | 1/2014 | Heinrichs |
| 2014/0059004 A1 | 2/2014 | Sasson et al. |

FOREIGN PATENT DOCUMENTS

WO 2012177272 A1 12/2012

OTHER PUBLICATIONS

International Search Report issued in PCT Application No. PCT/US2021/045004, dated Nov. 26, 2021, pp. 1-3.
List of Patents or Patent Applications Treated as Related dated Apr. 27, 2022, 5 pages.

*Primary Examiner* — Jinsong Hu
*Assistant Examiner* — Alexander J Yi
(74) *Attorney, Agent, or Firm* — Tutunjan & Bitetto, P.C.

(57) ABSTRACT

A method for text capture is provided. The method receives as inputs from a user via a mobile-text enabled device of the user, one or more telephone numbers of one or more mobile text-enabled devices of other users to engage in a message exchange there among and an additional non-user phone number dedicated only for message capture by a SMS API Provider which uses its Short Message Service (SMS) Application Programming Interface (API) for momentarily synchronizing with a SMS API gateway of a remote message capture device connected to the SMS API provider. The method momentarily captures, by the SMS API gateway of the remote message capture device using the momentary synchronization with the SMS API provider, message content and metadata for messages of the message exchange. The method stores, by the remote message capture device, the message content and the metadata in a searchable remote message repository.

12 Claims, 13 Drawing Sheets

CAPTURING MESSAGES FROM A PHONE MESSAGE EXCHANGE

BACKGROUND

The present invention relates generally to information processing and, in particular, to a capturing messages from a phone message exchange.

Both IOS® by APPLE® and Android® by Google® allow for messages to be sent between phones that use these operating systems. However, if a party wants to select only certain threads to archive and not others on a mixed use (business and personal) phone, no automatic means exists to accomplish the same. Hence, there is a need for an automated way to selectively perform message archiving on mixed use phones.

SUMMARY

According to aspects of the present invention, a method for text capture is provided. The method includes receiving as inputs from a user via a mobile-text enabled device of the user, one or more telephone numbers of one or more mobile text-enabled devices of other users to engage in a message exchange there among and an additional non-user phone number dedicated only for message capture by a SMS API Provider which uses its Short Message Service (SMS) Application Programming Interface (API) for momentarily synchronizing with a SMS API gateway of a remote message capture device connected to the SMS API provider. The method further includes momentarily capturing, by the SMS API gateway of the remote message capture device using the momentary synchronization with the SMS API provider, message content and metadata for messages of the message exchange. The method also includes storing, by the remote message capture device, the message content and the metadata in a searchable remote message repository.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
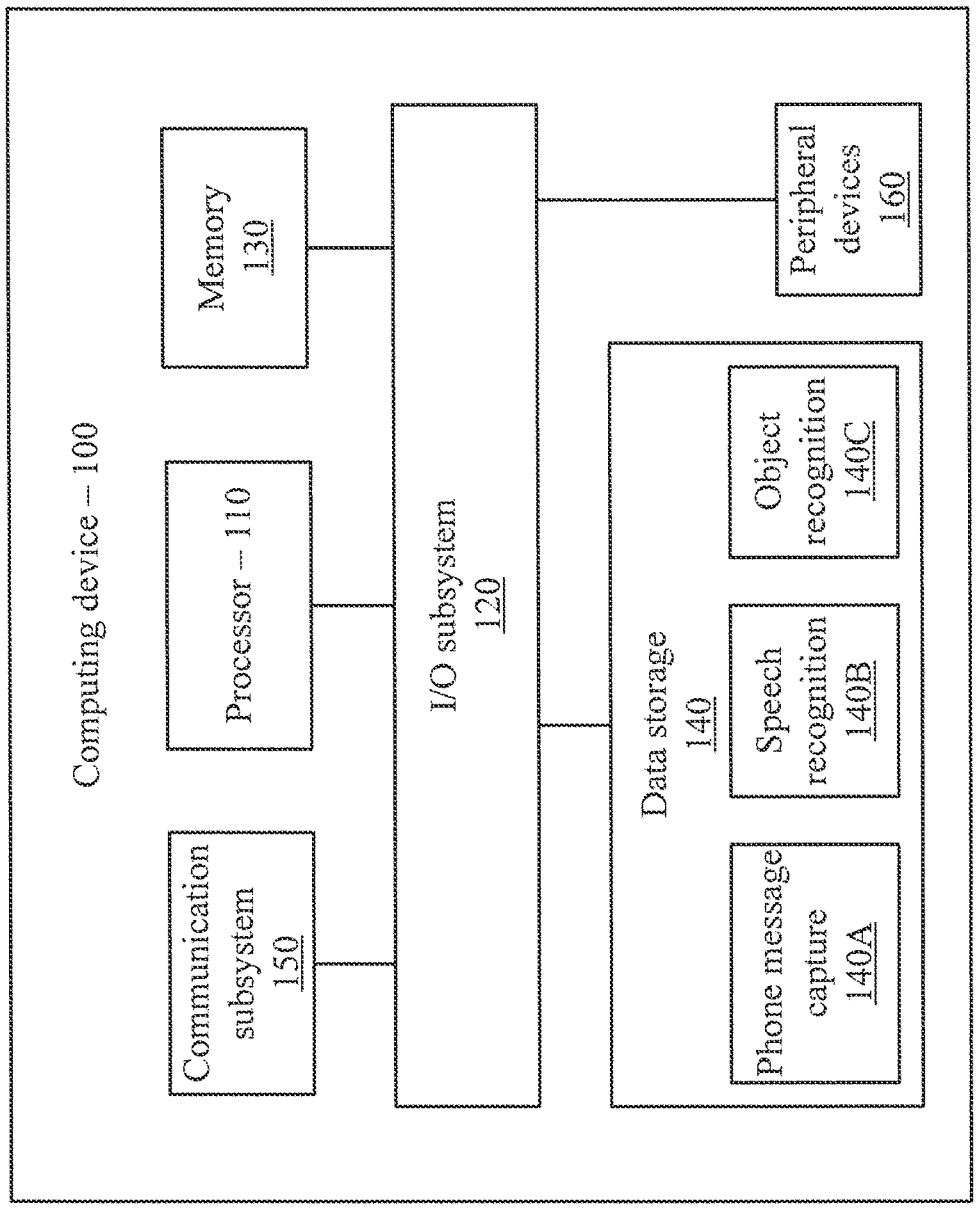
FIG. 1 is a block diagram showing an exemplary computing device, in accordance with an embodiment of the present invention.

Embodiments of the present invention are directed to capturing messages from a phone message exchange between two or more parties with matter association. The present invention can be used with phones operating using IOS®, Android®, or any other operating system.

Advantageously, the present invention can capture, for example, IMESSAGES and short message service (SMS) messages between two or more participants. In this way, non-participants to the phone message exchange can nevertheless see and review the message contents that have been exchanged and/or metadata (e.g., timestamps, involved parties, etc.) related to the messages. Moreover, participants to the phone message exchange can see the metadata in addition to the messages if they are using various embodiments of the present invention. Thus, depending upon the application/usage, the actual message content and/or metadata related to the message can be provided to the user. In the latter case, solely timestamps and/or other metadata (involved parties) can be provided to protect message content privacy while providing information relating to the message exchange.

A multitude of uses of message capture are readily determined by one of ordinary skill in the art, given the teachings of the present invention provided herein. For example, transcripts of business discussions and negotiations, monitoring of financial advisors for Financial Industry Regulatory Authority (FINRA) compliance, work monitoring, work billing, and so forth are some of the myriad of applications to which embodiments of the present invention can be readily applied by one of ordinary skill in the art given the teachings of the present invention provided herein, while maintaining the spirit of the present invention.

To this end, in accordance with an embodiment of the present invention, a user, who may or may not be a message exchange participant but wishes to capture messages involving at least one particular party facilitates the creation of a group chat between the at least one particular party and other parties using an additional "message capturing phone number" used for message capture. The phone number used for capture is the phone number of an iPhone that is connected, using the same common APPLE ID, to a MAC. An APPLE ID is an authentication method used by APPLE for APPLE devices involving an email address and a password. APPLE IDs include user personal information and settings. When an APPLE ID is used to log into an APPLE device, the device will automatically use the settings associated with the APPLE ID. In accordance with various embodiments of the present invention, an APPLE ID is used to facilitate message capture. Further to that end, an additional phone and a monitoring device (e.g., MAC) share a common APPLE ID. The terms APPLE ID and message synchronizing control ID are used interchangeably herein.

Further to the preceding, searching on a searchable remote message repository can be performed using a matter number that is dynamically associated with one or more threads (or even with one or more telephone numbers presuming that the threads will be dedicated, for at least a period of time, to discussing a particular matter) of a message exchange. Matter numbers can be used for a variety of purposes including, but not limited to, invoicing, work tracking (monitoring actual hours worked, etc.), and so forth.

FIG. 1 is a block diagram showing an exemplary computing device 100, in accordance with an embodiment of the present invention. Computing device 100 can be message capture device 210 and/or remote message repository 230 in FIG. 2, in accordance with one implementation of the message capture device 210 and/or remote message repository 230. The computing device 100 is configured to perform phone message capture.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110, the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code 140A for IPHONE® message capture. The data storage device 140 can store program code 140B for speech recognition. The data storage device 140 can store program code 140C for object recognition. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 3:
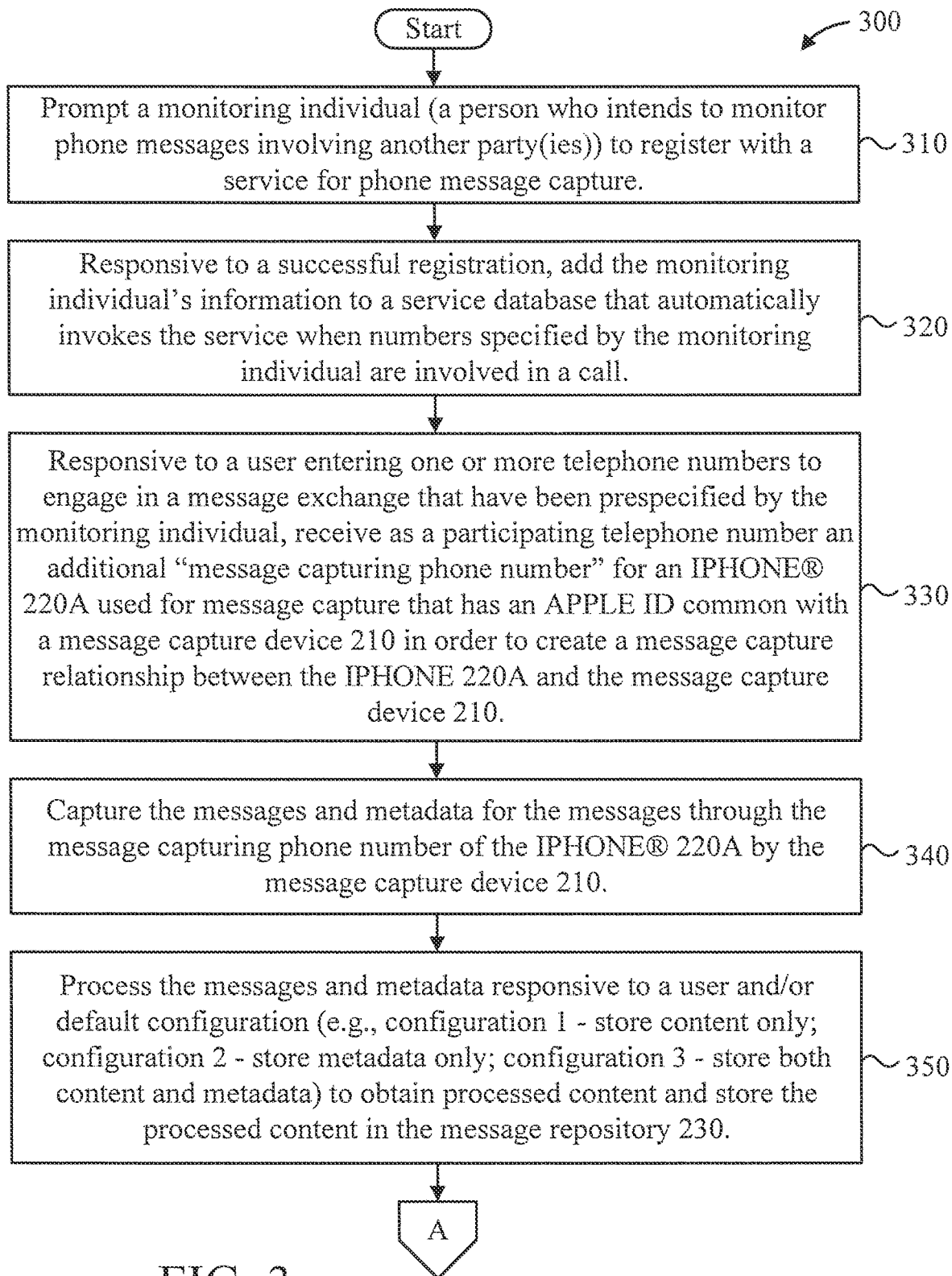
FIGS. 3-4 are flow diagrams showing an exemplary method for phone message capture, in accordance with an embodiment of the present invention.
Figure 4:
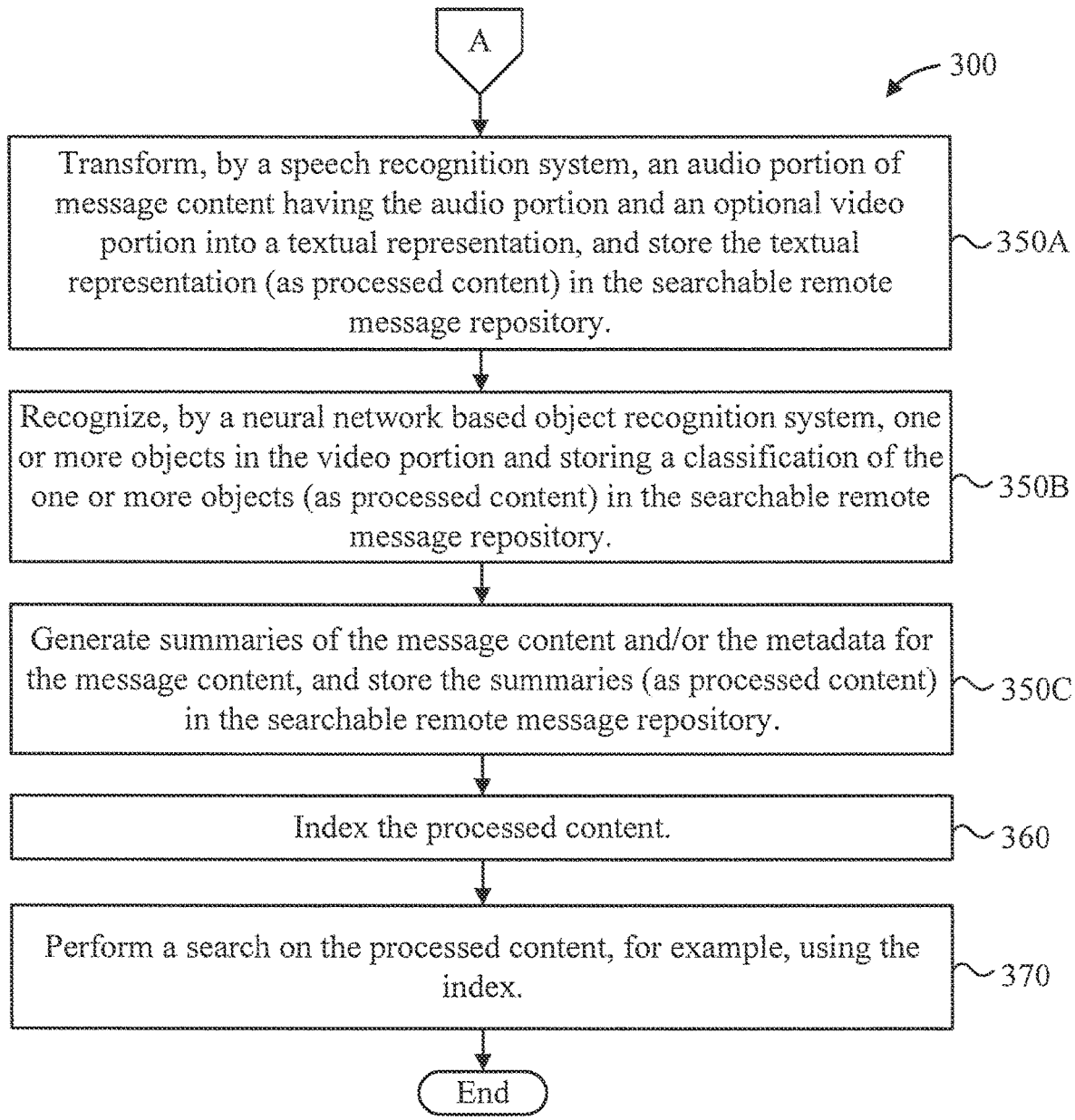
Figure 6:
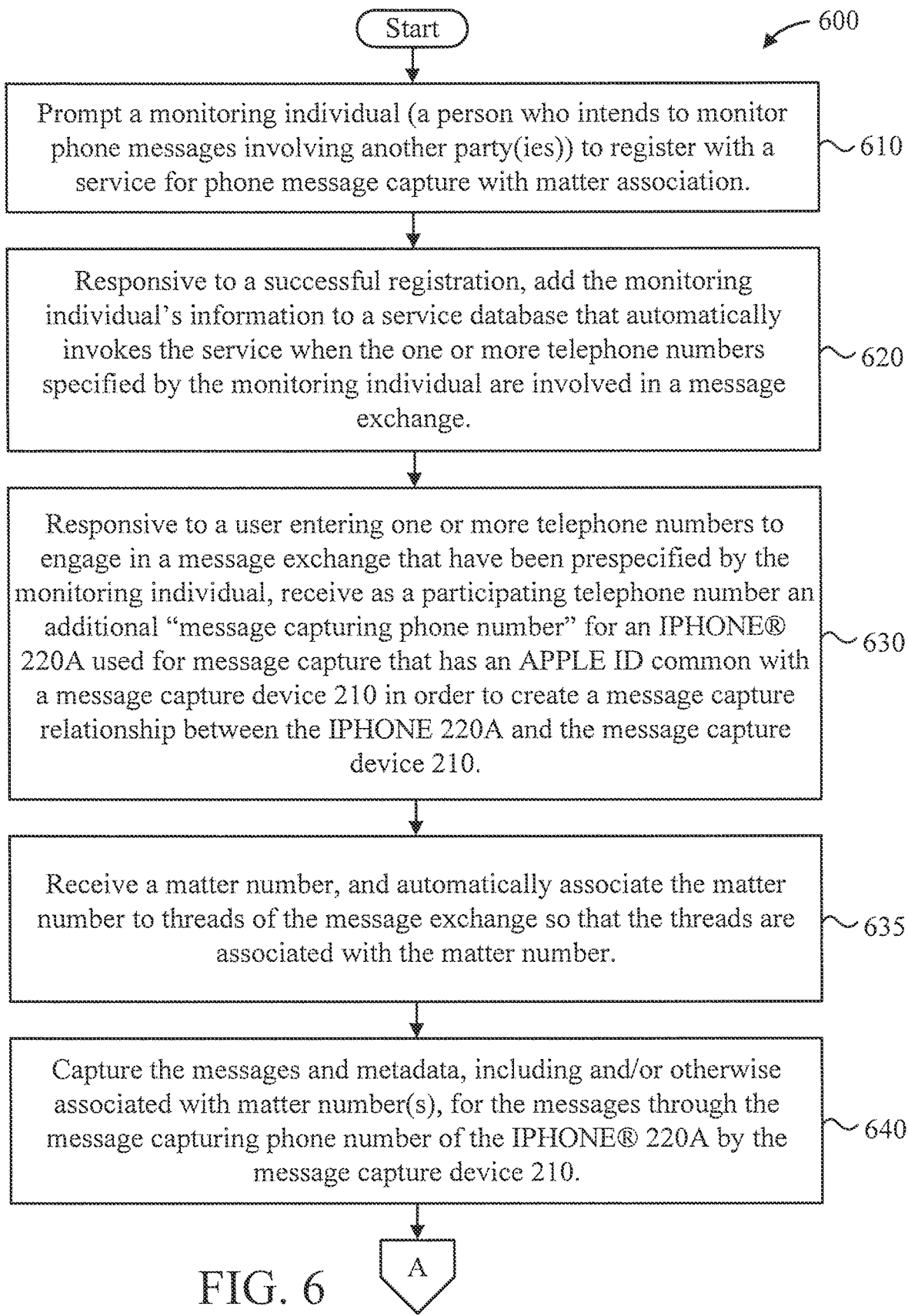
FIG. 6-7 are flow diagrams showing an exemplary method for phone message capture with matter number association, in accordance with an embodiment of the present invention.
Figure 7:
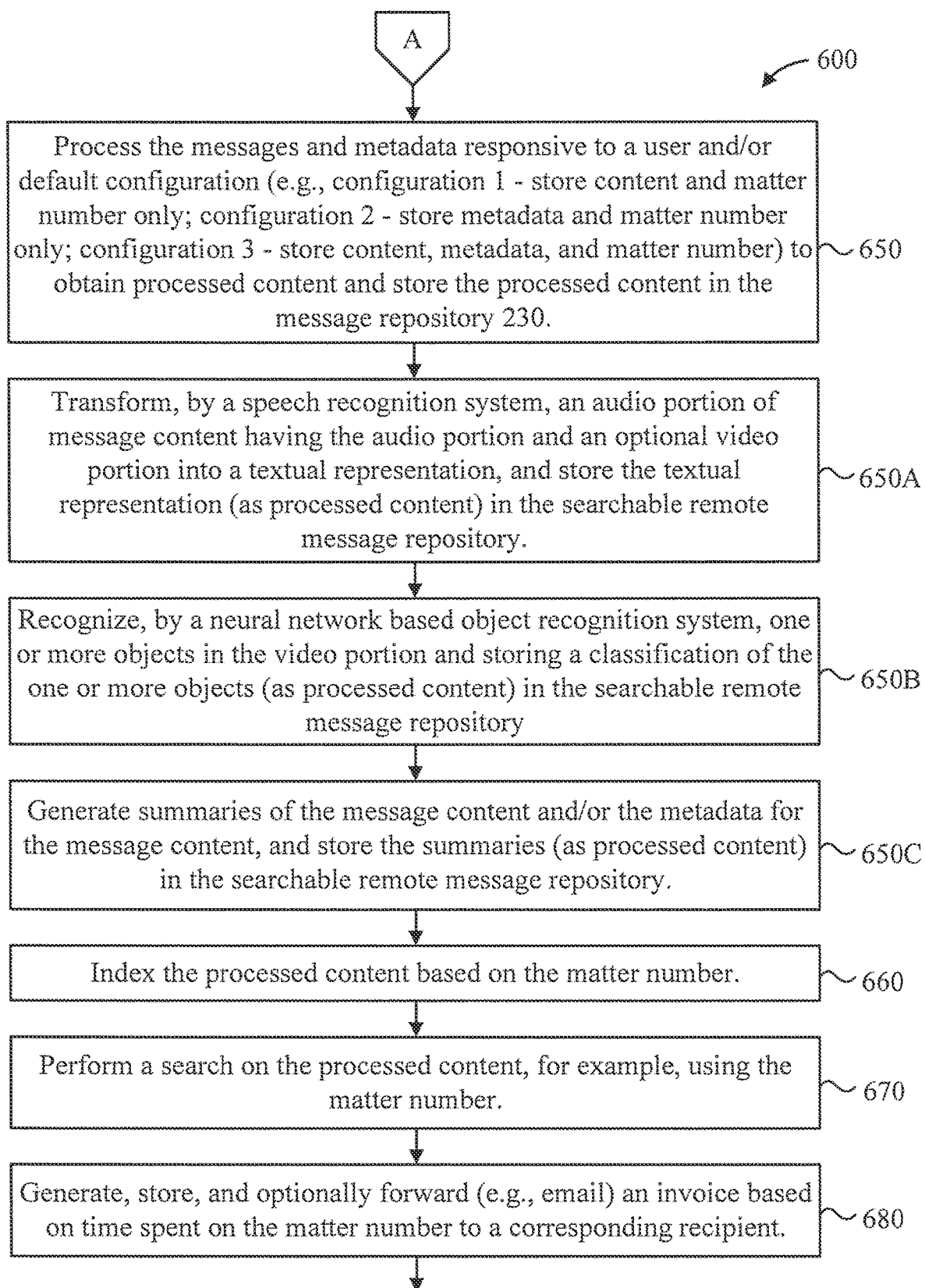

Hereinafter, FIG. 2 describes an exemplary system for message capture, followed by a description of a method (FIGS. 3-4) for message capture, followed by a description of a registration screen (FIG. 5) corresponding to the method of FIGS. 3-4, followed by a description of a method (FIGS. 6-7) for message capture with matter association, followed by a description of a registration screen (FIG. 8) corresponding to the method of FIGS. 6-7. In general, FIGS. 2-8 are directed to the use of a IPHONE® and a message capture device (e.g., a MAC) for message capture in accordance with the present invention.

Figure 2:
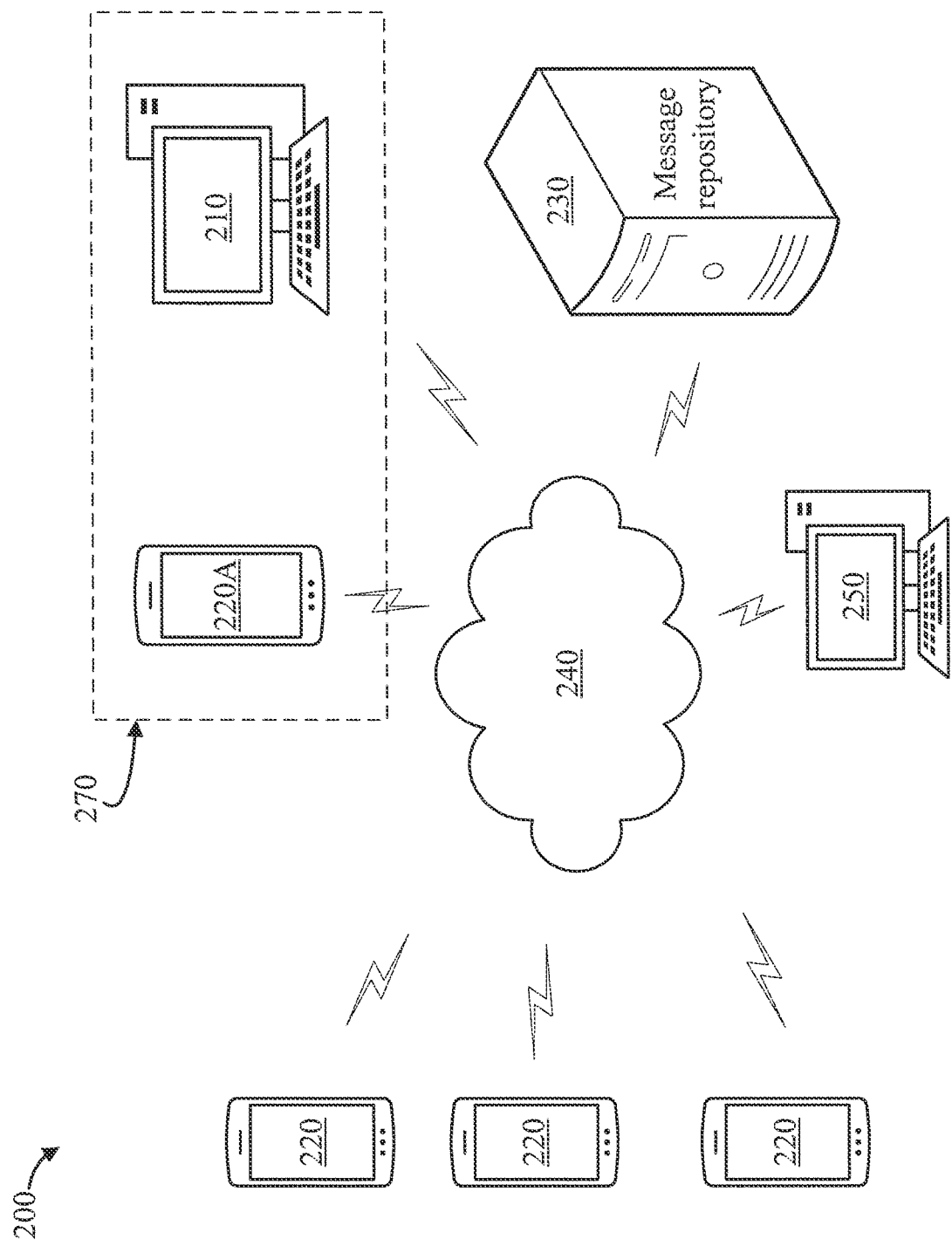
FIG. 2 is a block diagram showing an exemplary system for message capture, in accordance with an embodiment of the present invention.

FIG. 2 shows an exemplary system 200 for message capture, in accordance with an embodiment of the present invention.

The system 200 includes a message capture device 210, a set of phones 220, and a remote message repository 230.

The set of phones 220 includes an IPHONE® 220A, which is dedicated for message capture and is not associated with an individual message exchange participant but instead is associated with a message capture service together with the message capture device 210 and message repository 230 in accordance with an embodiment of the present invention. The remaining phones in the set are available for person-to-person message exchange and are under the control of their respective owners. It is to be appreciated that the remaining phones in the set (other than IPHONE 220A) can be all or a mix of any other message-enabled phone including IPHONES, ANDROIDS, message-enabled flip-phones, and so forth.

In an embodiment, the message capture device 210 is implemented by a MAC device (e.g., a MAC, IMAC, or MAC PRO®). The message capture device 210 captures messages through IPHONE® 220A by sharing a common APPLE ID with the IPHONE® 220A. In further detail, the sharing of a common APPLE ID between the IPHONE® 220A and the message capture device 210 (MAC device) enables an automatic message synchronization between any messages sent to that IPHONE® 220A so that the messages are duplicated on the message capture device 210. To that end, the IPHONE® 220A and the message capture device 210 form a synchronized data interception device pair 270.

The message capture device 210, the set of phones 220, and the message repository 230 can communicate with each other over one or more networks 240 using any communication technology including, but not limited to, cellular, Bluetooth®, and Wi-Fi®.

Depending upon the configuration, the message capture device 210 can record all of the message content and/or metadata (e.g., timestamps, involved parties, etc.) for the messages.

Depending upon the configuration, the message capture device 210 can remove/redact certain information before storing message related information in the message repository 230. Information that can be redacted includes, but is not limited to, the message content itself, involved participants, certain pre-designated keywords, message timestamps, and/or so forth. In this way, only certain types of data (content, metadata) can be selectively stored for review.

In an embodiment, a tiered approach to storage is used where depending upon your access level, more information (e.g., the content versus simply the metadata or a content summary or content topic) can be accessed. For example, a highest tier may afford access to everything, a second highest tier may afford access to the content while restricting access to the metadata or portions thereof, and subsequent tiers may afford access to the metadata or various portions thereof while restricting access to the actual content (e.g., while still providing a content summary depending upon the tier). In this way, underlings in a particular environment can be designated to only see portions of all of the content, as pertinent to their job and degree of involvement. Thus, in an embodiment, the original information and selective portions thereof can be stored depending upon the implementation. These and other variations in regard to data access and data storage are readily determined by one of ordinary skill in the art given the teachings of the present invention provided herein.

In an embodiment, access is provided based on the persons working on a particular matter. Thus, in such a case, an attorney assigned to a particular matter number and his particular staff can be permitted access to certain threads pertaining to the matter number while other attorneys in the same firm are restricted from accessing the same. This approach can be applied to an accounting firm, a medical practice, and so forth.

These and other variations on data access are readily determined by one of ordinary skill in the art given the teachings of the present invention provided herein, while maintaining the spirit of the present invention.

The remote message repository 230 stores message content and/or message metadata based on user configurations. The remote message repository 230 is readily searchable to enable extraction of desired information pertaining to a phone message exchange.

As is evident to one of ordinary skill in the art given the teachings of the present invention provided herein, a user who intends to capture message related information can be a message participant or some other entity. Other exemplary entities can be, but are not limited to, attorneys, doctors, designated personal, employers, and so forth. The entity(ies) depend upon the implementation. For the sake of illustration, another computing entity 250 than those shown in task with submitting searches and displaying the search results.

In an embodiment, the present invention can be used to associate text conversations with matter numbers for a variety of tasks, as readily appreciated by one of ordinary skill in the art given the teachings of the present invention provided herein. For example, many businesses use matter numbers such as accounting firms, law firms, and essentially any business that assigns a unique number to a given task/assignment/person/etc. In this way, the business can track their pending (and even closed) matters for a myriad of purposes including, for example, but not limited to, invoicing, supervisory review (regarding a work putting in the required time or involving the required content at a given time stage in a workflow), and so forth.

FIGS. 3-4 are flow diagrams showing an exemplary method 300 for phone message capture, in accordance with an embodiment of the present invention.

At block 310, prompt a monitoring individual (a person who intends to monitor phone messages involving another party(ies)) to register with a service for phone message capture. In an embodiment, a corresponding registration process can request telephone numbers of parties to be monitored, as well as other information (see, e.g., FIG. 5).

At block 320, responsive to a successful registration, add the monitoring individual's information to a service database that automatically invokes the service when numbers specified by the monitoring individual are involved in a call.

At block 330, responsive to a user entering one or more telephone numbers to engage in a message exchange that have been prespecified by the monitoring individual, receive as a participating telephone number an additional "message capturing phone number" for an IPHONE® 220A used for message capture that has an APPLE ID common with a message capture device 210 in order to create a message capture relationship between the IPHONE 220A and the message capture device 210.

At block 340, capture the messages and metadata for the messages through the message capturing phone number of the IPHONE® 220A by the message capture device 210. This involves a synchronization between the messages on the two devices, the IPHONE 220A® and the message capture device 210 that automatically occurs due to the sharing of the common APPLE ID between these two devices and enablement of the syncing feature on each of the devices (IPHONE 220A and message capture device 210).

At block 350, process the messages and metadata responsive to a user or default configuration (e.g., configuration 1—store content only; configuration 2—store metadata only; configuration 3—store both content and metadata) to obtain processed content and store the processed content in the message repository 230. It is to be appreciated that the content can include multimedia content (audio-visual files) and so forth. For privacy concerns, in some instances, image data can be redacted as described herein, but summarized through neural network based object recognition systems. Supervised or unsupervised neural network based object recognition approaches can be used depending upon the implementation. In this way, specific privacy can be maintained while the overall content can be gleaned from the image for conveyance to a monitoring party. Similarly, for audio files attached to a text message, automatic speech recognition can be performed on the audio content portion of the text message in order to transcribe the content for use by the present invention.

Accordingly, in an embodiment, block 350 can include one or more of blocks 350A through 350C. It is to be appreciated that the messages can include content including audio and/or video portions. While shown as belong to block 350, blocks 350A through 350C can be performed as part of the capture step in another embodiment. In such a case, the outputs of these blocks can be simply stored versus stored in the searchable remote message repository.

At block 350A, transform, by a speech recognition system, an audio portion of message content having the audio portion and an optional video portion into a textual representation, and store the textual representation (as processed content) in the searchable remote message repository.

At block 350B, recognize, by a neural network based object recognition system, one or more objects in the video portion and storing a classification of the one or more objects (as processed content) in the searchable remote message repository.

At block 350C, generate summaries of the message content and/or the metadata for the message content, and store the summaries (as processed content) in the searchable remote message repository. For example, keywords from the message content can be extracted. Extraction can be based on metrics that are based on times/percentage of occurrences of a keyword in an overall text exchange, and so forth.

At block 360, index the processed content. The processed content can be indexed based on what is stored including, but not limited to, involved parties, message content, message content type (text/audio/video), timestamps, other message metadata, and so forth. The indexing of the processed content readily enables searching to be performed on the stored indexed content. In this way, the information can be used in a variety of ways, some of which are described herein for the sake of illustration and others readily determined by one of ordinary skill in the art based on the teachings provided herein.

At block 370, perform a search on the processed content, for example, using the index. The search can be conducted, for example, based on the initial user configuration.

Figure 5:
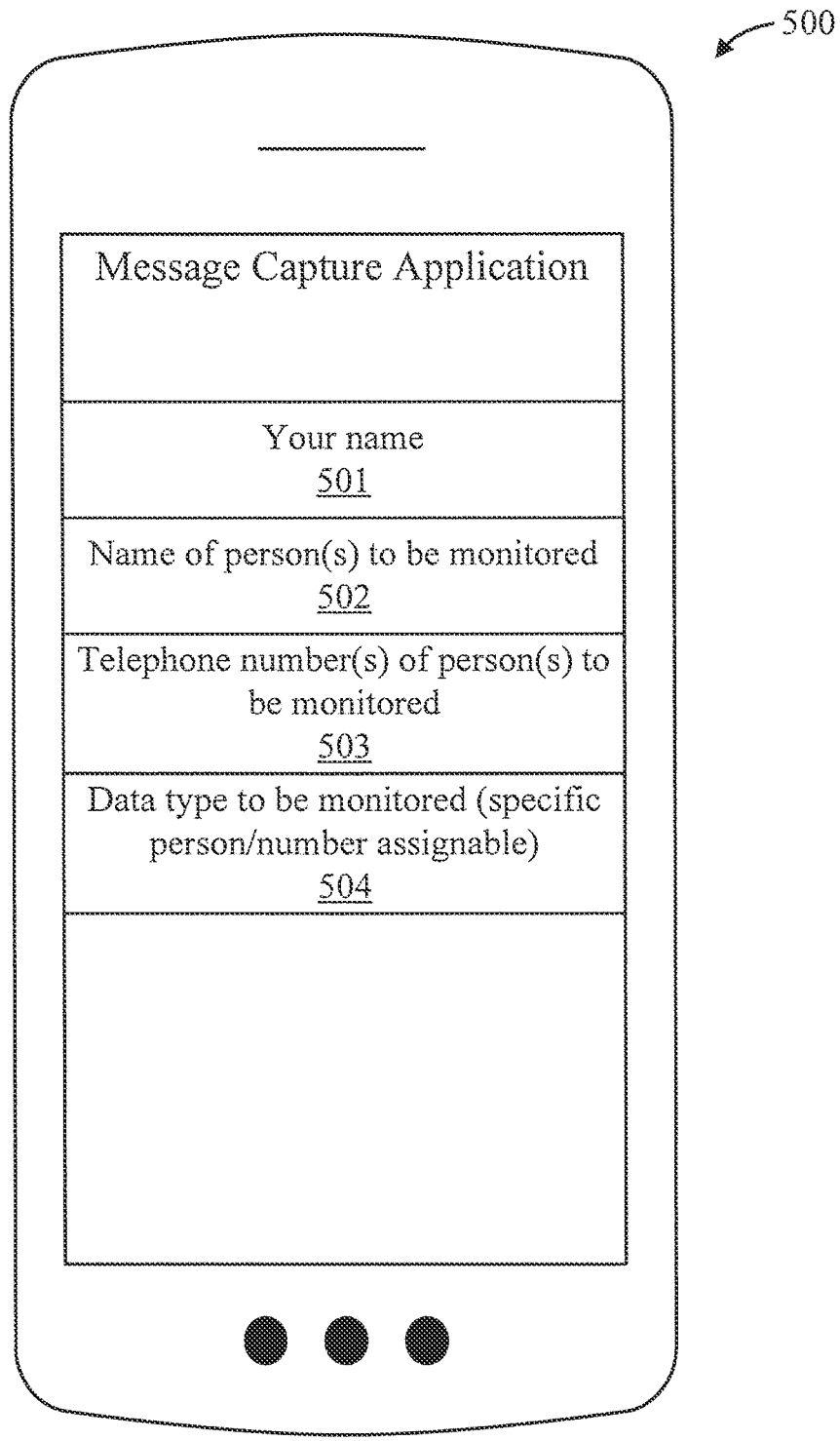
FIG. 5 is a block diagram showing an exemplary display screen of a computing device corresponding to a message capture registration process, in accordance with an embodiment of the present invention.

FIG. 5 is a block diagram showing an exemplary display screen 500 of a computing device corresponding to a message capture registration process, in accordance with an embodiment of the present invention.

In the screen, the following fields are shown, which are filled by a monitoring individual (a person seeking to monitor text messages): your name field 501; name(s) of person(s) to be monitored field 502; telephone number(s) of person(s) to be monitored field 503; and data type to be monitored field 504 (for each specified person/number). Field 504 can be omitted depending upon the implementation (e.g., the pre-specified configuration). Different types of data can be viewed depending upon the user selection for a given person being monitored.

The data type to be monitored field 504 can include, for example, but is not limited to, fields relating to message content and metadata. The metadata can involve any possible message related metadata including, but not limited to, content summary, involved parties, timestamps, attachments, types of attachments (audio/video/multimedia) and so forth.

A description will now be given with respect to FIGS. 6 and 7 in relation to various embodiments of the present invention directed to the text capture together with an association of the text capture with a matter number.

FIG. 6-7 are flow diagrams showing an exemplary method 600 for phone message capture with matter association, in accordance with an embodiment of the present invention.

At block 610, prompt a monitoring individual (a person who intends to monitor phone messages involving another party(ies)) to register with a service for phone message capture with matter association. In an embodiment, a corresponding registration process can request telephone numbers of parties to be monitored, and other information (see, e.g., FIG. 5).

At block 620, responsive to a successful registration, add the monitoring individual's information to a service database that automatically invokes the service when the one or more telephone numbers specified by the monitoring individual are involved in a message exchange.

At block 630, responsive to a user entering one or more telephone numbers to engage in a message exchange that have been prespecified by the monitoring individual, receive as a participating telephone number an additional "message capturing phone number" for an IPHONE® 220A used for message capture that has an APPLE ID common with a message capture device 210 in order to create a message capture relationship between the IPHONE 220A and the message capture device 210.

At block 635, receive a matter number, and automatically associate the matter number to threads of the message exchange so that the threads are associated with the matter number. In this way, message content and/or metadata for the message content is associated with a matter number of tracking, billing, and a myriad of other purposes. It is to be appreciated that block 635 can be performed at any time before or during a message exchange and the matter number can be changed one or multiple times during the message exchange. Thus, for example, once pleasantries have been initially exchanged, work can resume with a subsequent text exchange that commences by specifying a corresponding matter number, followed by a yet subsequent text exchange that commences by specifying yet another corresponding matter number. In this way, matter numbers can be dynamically assigned and switched as needed during a message exchange.

At block 640, capture the messages and metadata, including and/or otherwise associated with matter number(s), for the messages through the message capturing phone number of the IPHONE® 220A by the message capture device 210. This involves a synchronization between the messages on the two devices, the IPHONE 220A® and the message capture device 210 that automatically occurs due to the sharing of the common APPLE ID between these two devices.

At block 650, process the messages and metadata responsive to a user and/or default configuration (e.g., configuration 1—store content and matter number only; configuration 2—store metadata and matter number only; configuration 3—store content, metadata, and matter number) to obtain processed content and store the processed content in the message repository 230. It is to be appreciated that the content can include multimedia content (audio-visual files) and so forth. For privacy concerns, in some instances, image data can be redacted as described herein, but summarized through neural network based object recognition systems. Supervised or unsupervised neural network based object recognition approaches can be used depending upon the implementation. In this way, specific privacy can be maintained while the overall content can be gleaned from the image for conveyance to a monitoring party. Similarly, for audio files attached to a text message, automatic speech recognition can be performed on the audio content portion of the text message in order to transcribe the content for use by the present invention.

Accordingly, in an embodiment, block 650 can include one or more of blocks 650A through 650C. It is to be appreciated that the messages can include content including audio and/or video portions. While shown as belong to block 650, blocks 650A through 650C can be performed as part of the capture step in another embodiment. In such a case, the outputs of these blocks can be simply stored versus stored in the searchable remote message repository.

At block 650A, transform, by a speech recognition system, an audio portion of message content having the audio portion and an optional video portion into a textual representation, and store the textual representation (as processed content) in the searchable remote message repository.

At block 650B, recognize, by a neural network based object recognition system, one or more objects in the video portion and storing a classification of the one or more objects (as processed content) in the searchable remote message repository.

At block 650C, generate summaries of the message content and/or the metadata for the message content, and store the summaries (as processed content) in the searchable remote message repository.

At block 660, index the processed content. The processed content is indexed based on the matter number. The processed content can be further indexed based on other metadata such as, for example, but not limited to, involved parties, message content, message content type (text/audio/video), timestamps, other message metadata, and so forth. The indexing of the processed content readily enables searching to be performed on the stored indexed content, particularly by matter number where desired. In this way, the information can be used in a variety of ways, some of which are described herein for the sake of illustration and others readily determined by one of ordinary skill in the art based on the teachings provided herein.

At block 670, perform a search on the processed content, for example, using the matter number. The search can be conducted based on the initial user configuration.

At block 680, generate, store, and optionally forward (e.g., email) an invoice based on time spent on the matter number to a corresponding recipient. In an embodiment, block 680 can involve generating a spreadsheet of matter number versus time spent messaging in relation to the matter number.

Figure 8:
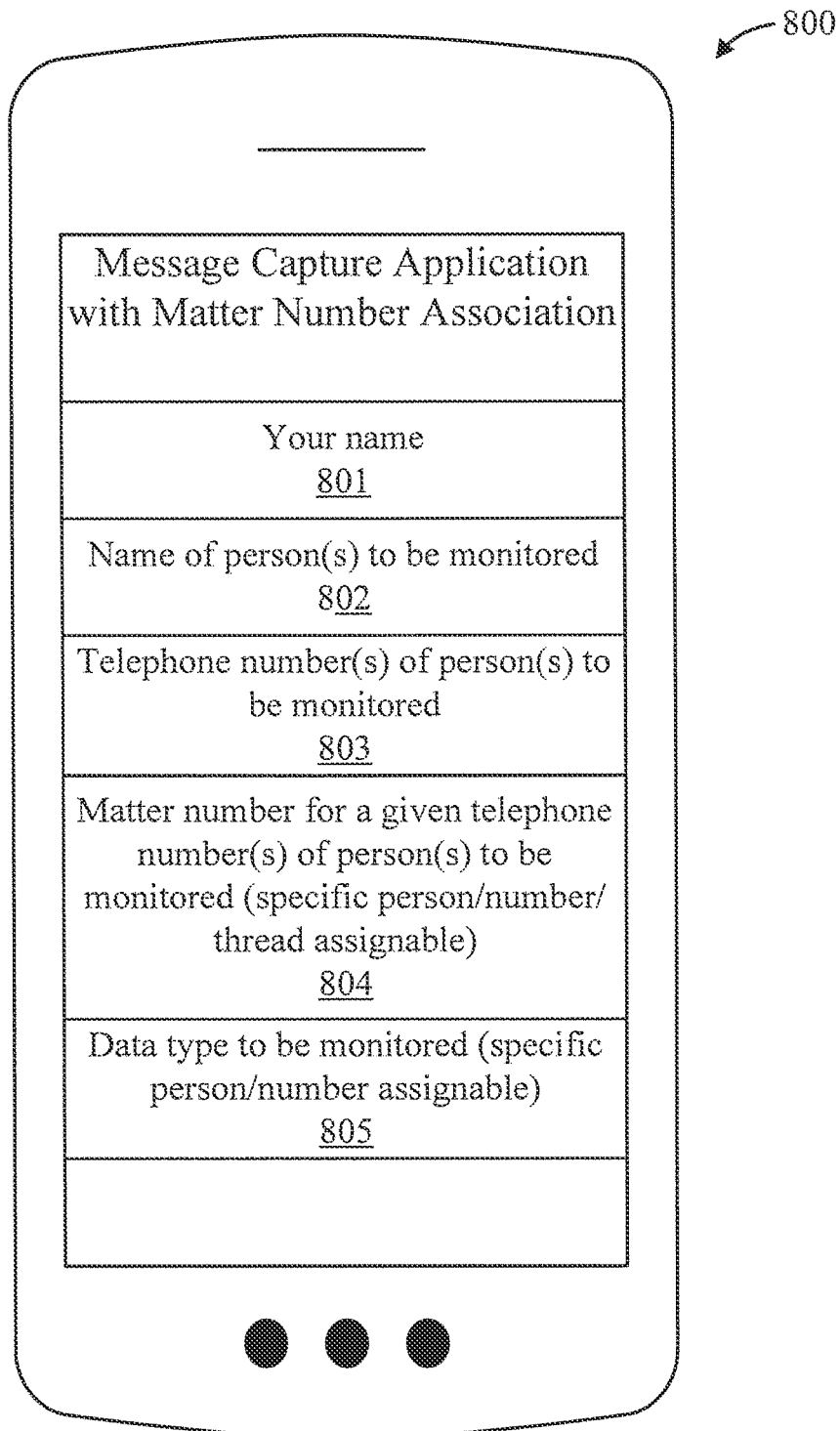
FIG. 8 is a block diagram showing an exemplary display screen of a computing device corresponding to a message capture registration process with matter number association, in accordance with an embodiment of the present invention.

FIG. 8 is a block diagram showing an exemplary display screen 500 of a computing device corresponding to a message capture registration process, in accordance with an embodiment of the present invention.

In the screen, the following fields are shown, which are filled by a monitoring individual (a person seeking to monitor text messages): your name field 801; name(s) of person(s) to be monitored field 802; telephone number(s) of person(s) to be monitored field 803; mater number for a given telephone number(s) of person(s) to be monitored field 804 (for each specified person, number, and/or thread); and data type to be monitored field 805 (for each specified person/number). In a preferred embodiment, the matter number is dynamically assignable during a message exchange and is capable of being changed on-the-fly during the message exchange to involve a different matter number. Fields 804 and 805 can be omitted depending upon the implementation (e.g., the pre-specified configuration). Different types of data can be viewed depending upon the user selection for a given person being monitored.

The data type to be monitored field 805 can include, for example, but is not limited to, fields relating to message content and metadata. The metadata can involve any possible message related metadata including, but not limited to, content summary, involved parties, timestamps, attachments, types of attachments (audio/video/multimedia) and so forth.

Hereinafter, FIG. 9 describes an exemplary system for message capture, followed by a description of a method (FIGS. 10-11) for message capture, followed by a description of a method (FIGS. 12-13) for message capture with matter association. In general, FIGS. 9-13 are directed to the use of a Short Message Service (SMS) Application Programming Interface (API) provider (e.g., Twilio®) for message capture in accordance with the present invention.

Figure 9:
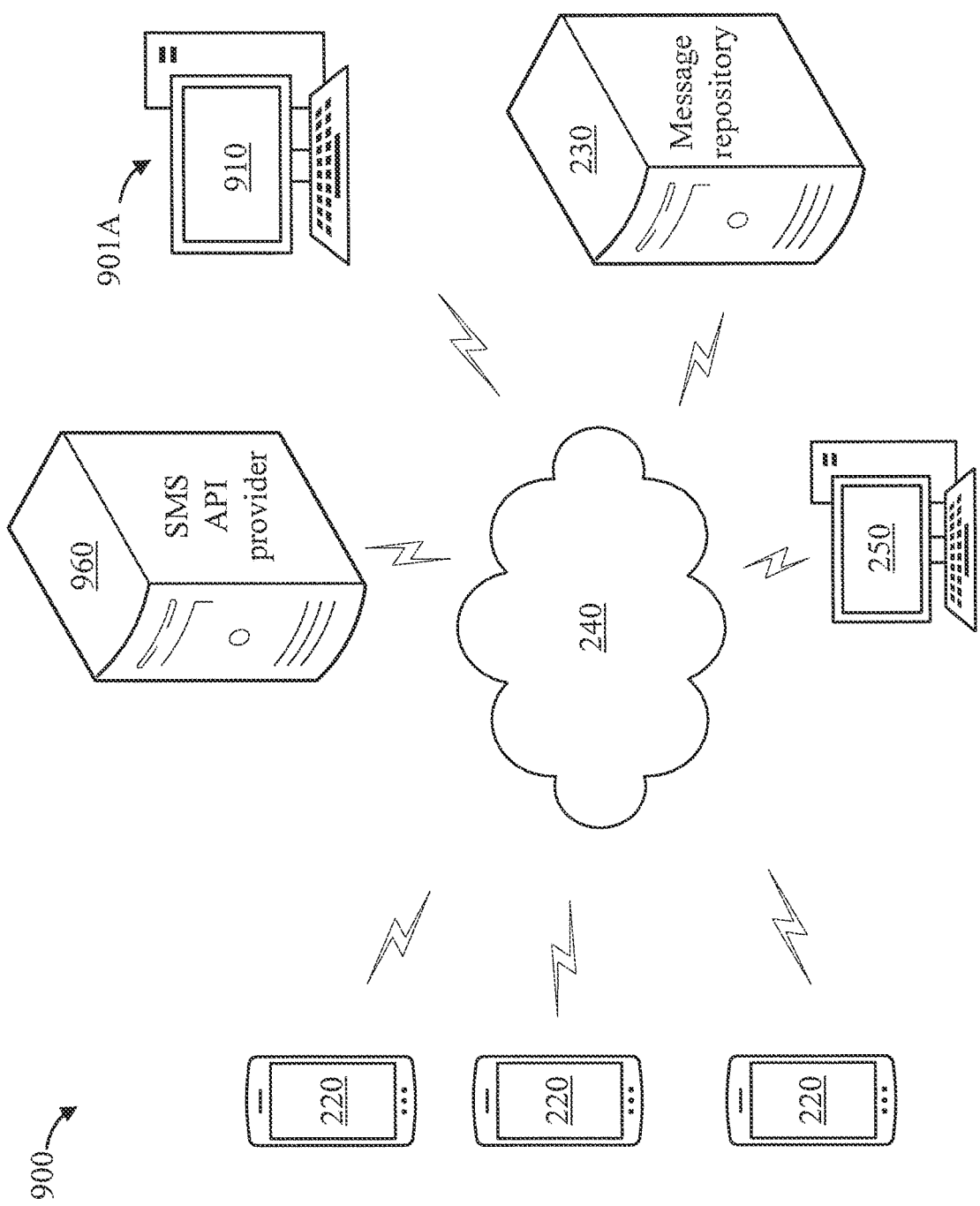
FIG. 9 is a block diagram showing an exemplary system for message capture, in accordance with an embodiment of the present invention.

FIG. 9 is a block diagram showing another exemplary system 900 for message capture, in accordance with an embodiment of the present invention.

System 900 is similar to system 200, with the exception of omitting IPHONE® 220A.

In the embodiment of FIG. 9, the message capture device 910 can be a device having a Short Message Service (SMS) gateway 910A to facilitate message capture. In the SMS gateway embodiment, the messages are sent to a phone number connected to an SMS Application Programming Interface (API) provider 960 (e.g. Twilio®) and then the messages are forwarded to the message capture device 910 (and then deleted by the provider (e.g., Twilio®) after being forwarded, and so the messages are momentarily synchronized). IPHONE 220A is not used in this embodiment. In an embodiment, the SMS gateway 910A can be a direct-to-mobile gateway. In an embodiment, the message capture device 910 is implemented by a MAC device (e.g., a MAC, IMAC, or MAC PRO®). Of course, non-Apple® products can be used for the message capture device 910 while maintaining the spirit of the present invention.

Figure 10:
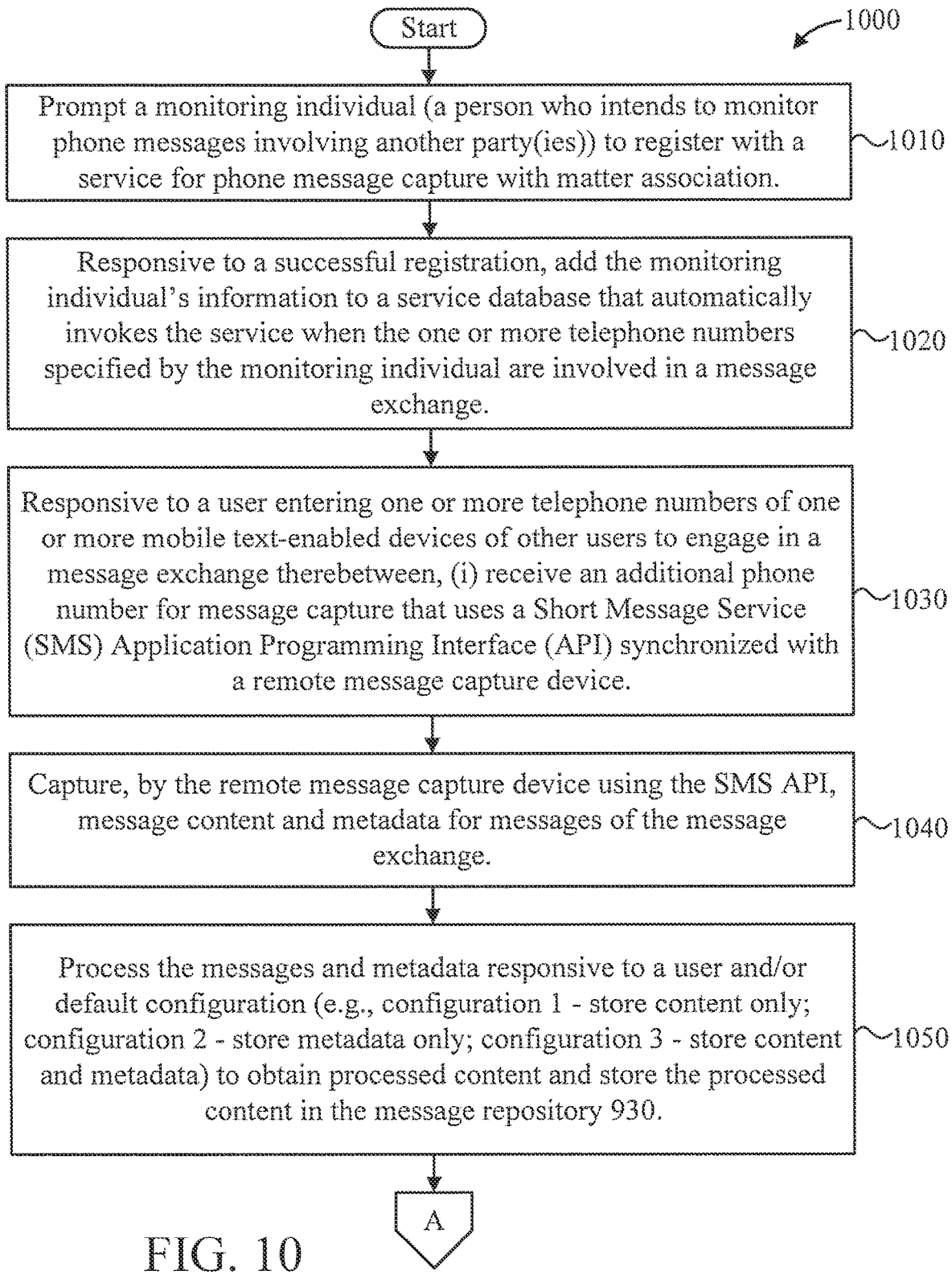
FIGS. 10-11 are flow diagrams showing another exemplary method for phone message capture, in accordance with an embodiment of the present invention.
Figure 11:
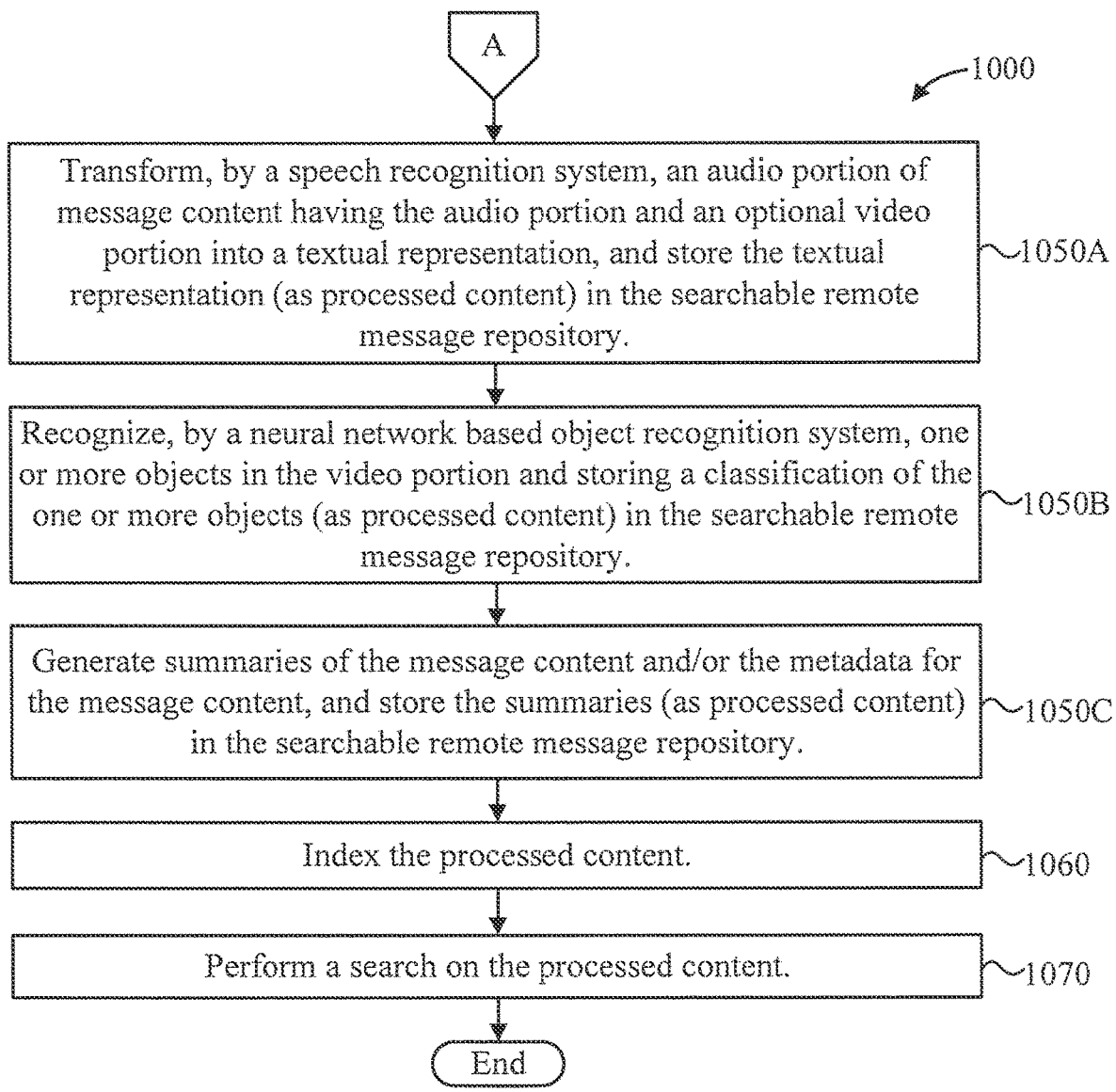

FIG. 10-11 are flow diagrams showing another exemplary method 1000 for phone message capture, in accordance with an embodiment of the present invention.

At block 1010, prompt a monitoring individual (a person who intends to monitor phone messages involving another party(ies)) to register with a service for phone message capture. In an embodiment, a corresponding registration process can request telephone numbers of parties to be monitored, and other information.

At block 1020, responsive to a successful registration, add the monitoring individual's information to a service database that automatically invokes the service when the one or more telephone numbers specified by the monitoring individual are involved in a message exchange.

At block 1030, responsive to a user entering one or more telephone numbers of one or more mobile text-enabled devices of other users to engage in a message exchange therebetween, receive an additional phone number for message capture that uses a Short Message Service (SMS) Application Programming Interface (API) synchronized with a remote message capture device.

At block 1040, capture, by the remote message capture device using the SMS API, message content and metadata for messages of the message exchange.

At block 1050, process the messages and metadata responsive to a user and/or default configuration (e.g., configuration 1—store content only; configuration 2—store metadata only; configuration 3—store content and metadata) to obtain processed content and store the processed content in the message repository 930. It is to be appreciated that the content can include multimedia content (audio-visual files) and so forth. For privacy concerns, in some instances, image data can be redacted as described herein, but summarized through neural network based object recognition systems. Supervised or unsupervised neural network based object recognition approaches can be used depending upon the implementation. In this way, specific privacy can be maintained while the overall content can be gleaned from the image for conveyance to a monitoring party. Similarly, for audio files attached to a text message, automatic speech recognition can be performed on the audio content portion of the text message in order to transcribe the content for use by the present invention.

Accordingly, in an embodiment, block 1050 can include one or more of blocks 1050A through 1050C. It is to be appreciated that the messages can include content including audio and/or video portions. While shown as belong to block 1050, blocks 1050A through 1050C can be performed as part of the capture step in another embodiment. In such a case, the outputs of these blocks can be simply stored versus stored in the searchable remote message repository.

At block 1050A, transform, by a speech recognition system, an audio portion of message content having the audio portion and an optional video portion into a textual representation, and store the textual representation (as processed content) in the searchable remote message repository.

At block 1050B, recognize, by a neural network based object recognition system, one or more objects in the video portion and storing a classification of the one or more objects (as processed content) in the searchable remote message repository.

At block 1050C, generate summaries of the message content and/or the metadata for the message content, and store the summaries (as processed content) in the searchable remote message repository.

At block 1060, index the processed content. The processed content can be indexed based on metadata such as, for example, but not limited to, involved parties, message content, message content type (text/audio/video), timestamps, other message metadata, and so forth. The indexing of the processed content readily enables searching to be performed on the stored indexed content, particularly by matter number where desired. In this way, the information can be used in a variety of ways, some of which are described herein for the sake of illustration and others readily determined by one of ordinary skill in the art based on the teachings provided herein.

At block 1070, perform a search on the processed content. The search can be conducted based on the initial user configuration.

Figure 12:
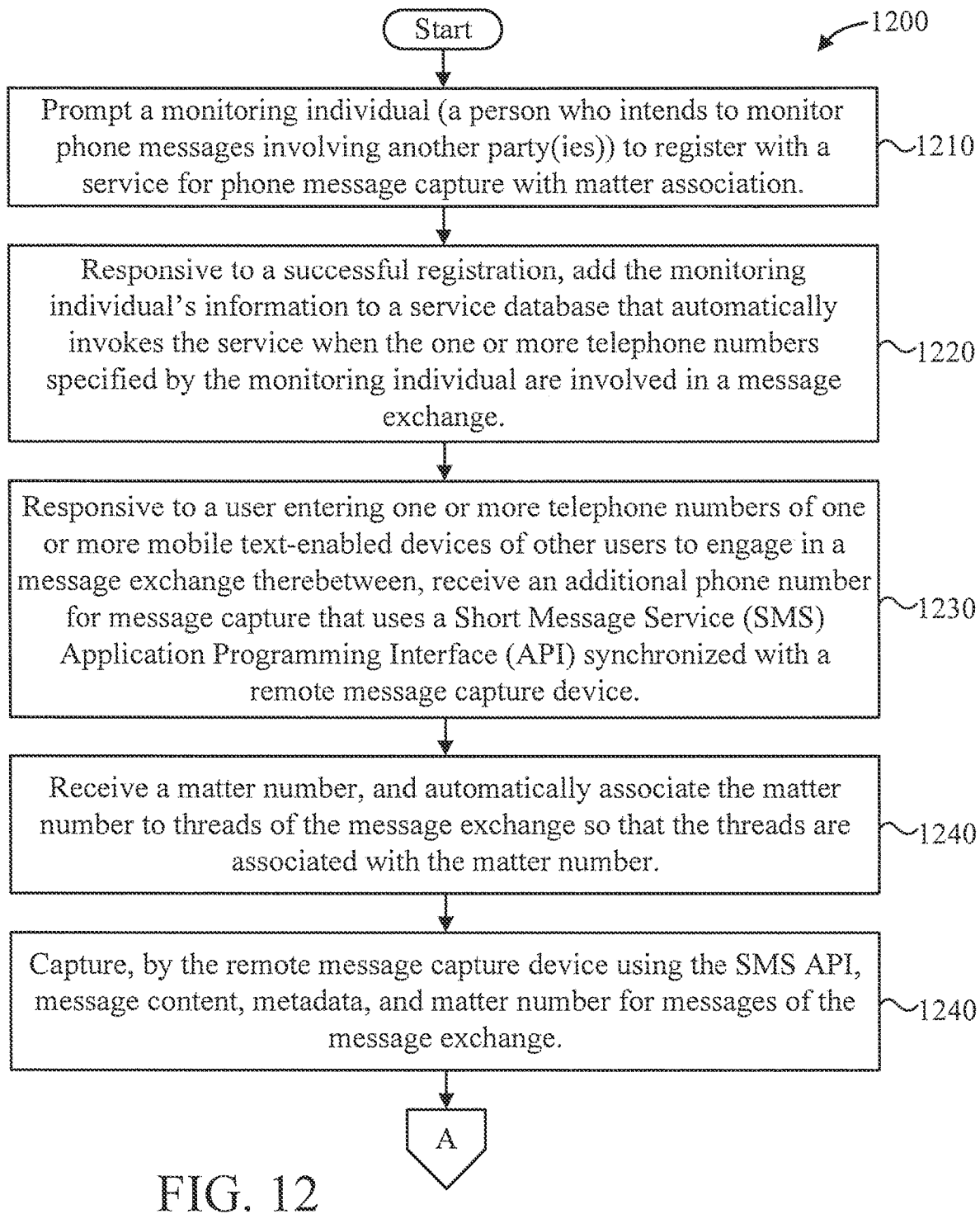
FIGS. 12-13 are flow diagrams showing another exemplary method for phone message capture with matter number association, in accordance with an embodiment of the present invention.
Figure 13:
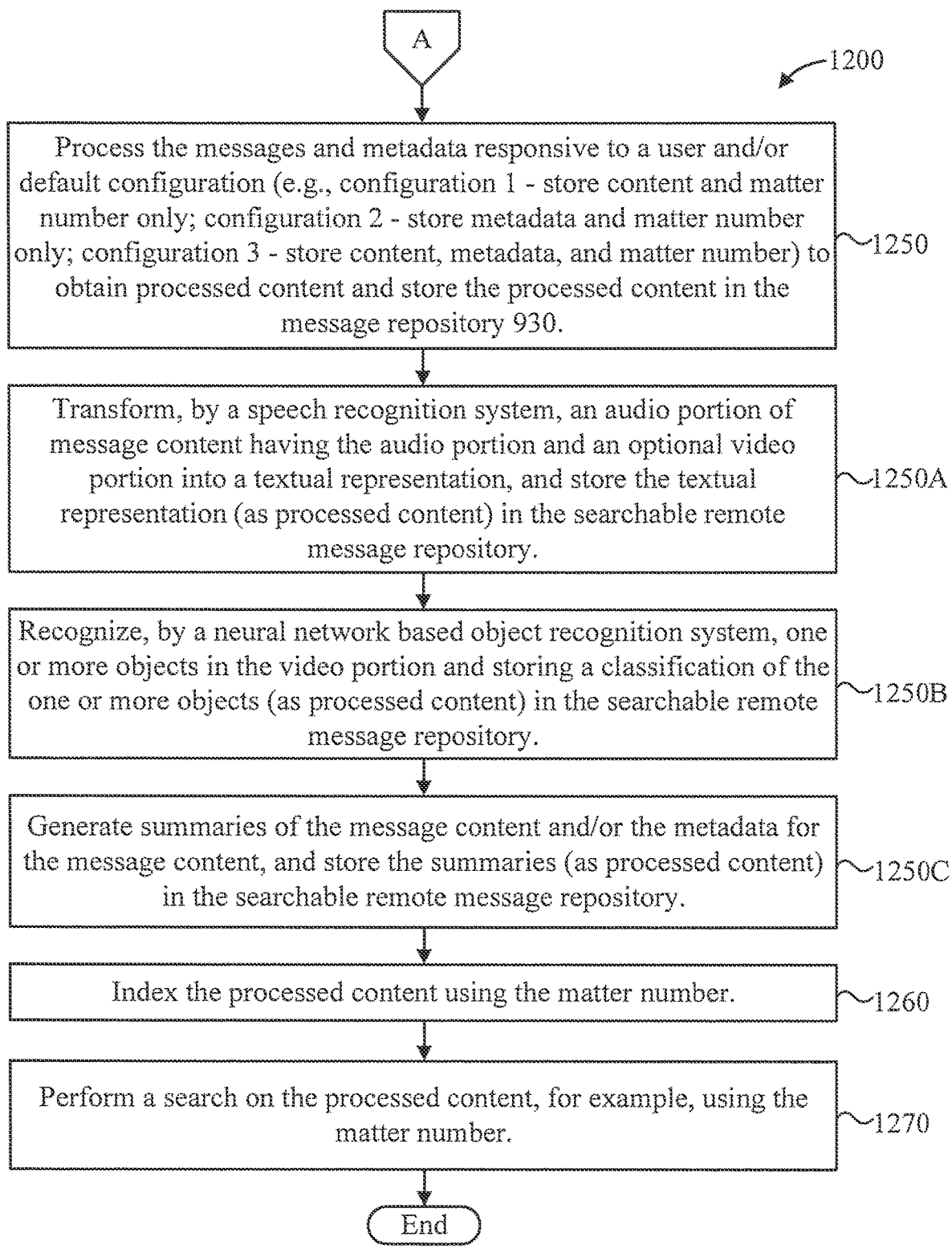

FIG. 12-13 are flow diagrams showing another exemplary method 1200 for phone message capture, in accordance with an embodiment of the present invention.

At block 1210, prompt a monitoring individual (a person who intends to monitor phone messages involving another party(ies)) to register with a service for phone message capture with matter association. In an embodiment, a corresponding registration process can request telephone numbers of parties to be monitored, and other information.

At block 1220, responsive to a successful registration, add the monitoring individual's information to a service database that automatically invokes the service when the one or more telephone numbers specified by the monitoring individual are involved in a message exchange.

At block 1230, responsive to a user entering one or more telephone numbers of one or more mobile text-enabled devices of other users to engage in a message exchange therebetween, receive an additional phone number for message capture that uses a Short Message Service (SMS) Application Programming Interface (API) synchronized with a remote message capture device.

At bock 1235, receive a matter number, and automatically associate the matter number to threads of the message exchange so that the threads are associated with the matter number. It is to be appreciated that block 1235 can be performed at any time before or during a message exchange and the matter number can be changed one or multiple times during the message exchange.

At block 1240, capture, by the remote message capture device using the SMS API, message content, metadata, and matter number for messages of the message exchange.

At block 1250, process the messages and metadata responsive to a user and/or default configuration (e.g., configuration 1—store content and matter number only; configuration 2—store metadata and matter number only; configuration 3—store content, metadata, and matter number) to obtain processed content and store the processed content in the message repository 930. It is to be appreciated that the content can include multimedia content (audiovisual files) and so forth. For privacy concerns, in some instances, image data can be redacted as described herein, but summarized through neural network based object recognition systems. Supervised or unsupervised neural network based object recognition approaches can be used depending upon the implementation. In this way, specific privacy can be maintained while the overall content can be gleaned from the image for conveyance to a monitoring party. Similarly, for audio files attached to a text message, automatic speech recognition can be performed on the audio content portion of the text message in order to transcribe the content for use by the present invention.

Accordingly, in an embodiment, block 1250 can include one or more of blocks 1250A through 1250C. It is to be appreciated that the messages can include content including audio and/or video portions. While shown as belong to block 1250, blocks 1250A through 1250C can be performed as part of the capture step in another embodiment. In such a case, the outputs of these blocks can be simply stored versus stored in the searchable remote message repository.

At block 1250A, transform, by a speech recognition system, an audio portion of message content having the audio portion and an optional video portion into a textual representation, and store the textual representation (as processed content) in the searchable remote message repository.

At block 1250B, recognize, by a neural network based object recognition system, one or more objects in the video portion and storing a classification of the one or more objects (as processed content) in the searchable remote message repository.

At block 1250C, generate summaries of the message content and/or the metadata for the message content, and store the summaries (as processed content) in the searchable remote message repository.

At block 1260, index the processed content. The processed content can be indexed based on the matter number. The processed content can be initially or further indexed based on other metadata such as, for example, but not limited to, involved parties, message content, message content type (text/audio/video), timestamps, other message metadata, and so forth. The indexing of the processed content readily enables searching to be performed on the stored indexed content, particularly by matter number where desired. In this way, the information can be used in a variety of ways, some of which are described herein for the sake of illustration and others readily determined by one of ordinary skill in the art based on the teachings provided herein.

At block 1270, perform a search on the processed content, for example, using the matter number. The search can be conducted based on the initial user configuration.

As noted, the present invention can be used relative to a cloud configuration. However, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models as described below.

The five exemplary characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The three Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The four Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

A cloud computing environment can include one or more cloud computing nodes with which local computing devices used by cloud consumers, such as, for example, cellular telephones. They may be grouped physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for text capture, comprising:
receiving as inputs from a user via a mobile-text enabled device of the user, one or more telephone numbers of one or more mobile text-enabled devices of other users to engage in a message exchange there among and an additional non-user phone number dedicated only for message capture by a SMS API Provider which uses its Short Message Service (SMS) Application Programming Interface (API) for momentarily synchronizing with a SMS API gateway of a remote message capture device connected to the SMS API provider;
momentarily capturing, by the SMS API gateway of the remote message capture device using the momentary synchronization with the SMS API provider, message content and metadata for messages of the message exchange; and
storing, by the remote message capture device, the message content and the metadata in a searchable remote message repository.

2. The method of claim 1, further comprising:
processing the message content and the metadata responsive to a pre-specified configuration to obtain processed content.

3. The method of claim 2, further comprising restricting the user from access to at least one of the message content and the metadata stored in the searchable remote message repository responsive to a user authorization level.

4. The method of claim 2, wherein processing the message content and the metadata comprises redacting portions of at least one of the message content and the metadata responsive to the pre-specified configuration.

5. The method of claim 2, wherein processing the message content and the metadata comprises generating summaries of at least one of the message content and the metadata responsive to the pre-specified configuration.

6. The method of claim 2, further comprising indexing the processed content to obtain indexed content, wherein the indexed content is indexed by an item selected from the group consisting of an involved party, a message content element, and a message metadata element.

7. The method of claim 1, wherein the method is provided as a cloud-based service wherein subscribers register for message monitoring.

8. The method of claim 1, wherein the message content includes media content comprising at least one of a video portion and an audio portion.

9. The method of claim 8, further comprising:
transforming, by a speech recognition system, the audio portion into a textual representation; and
storing the textual representation.

10. The method of claim 8, further comprising recognizing, by an object recognition system, one or more objects in the video portion and storing a classification of the one or more objects.

11. The method of claim 1, further comprising generating a spreadsheet of matter number versus time spent messaging in relation to the matter number.

12. The method of claim 1, wherein said capturing step comprises momentarily synchronizing the message content and the metadata by forwarding the message content and the metadata to the message capture device, and deleting the message content and the metadata by a SMS API provider.

* * * * *